(12) United States Patent
Kohei (10) Patent No.: US 7,602,587 B2
(45) Date of Patent: Oct. 13, 2009

(54) INFORMATION STORAGE THAT INCLUDES A HOUSING AND A PRINTED BOARD PROVIDED ON THE HOUSING, A PRINTED BOARD INCLUDING A COIL THAT FORMS AN ELECTROMAGNET IN COOPERATION WITH A MAGNETIC MEMBER, AND METHOD FOR MANUFACTURING AN ELECTROMAGNETIC LATCH UNIT

(75) Inventor: Toru Kohei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 11/607,635

(22) Filed: Nov. 30, 2006

(65) Prior Publication Data

US 2008/0019052 A1    Jan. 24, 2008

(30) Foreign Application Priority Data

Jul. 19, 2006    (JP) .............................. 2006-197417

(51) Int. Cl.
  *G11B 5/54* (2006.01)
(52) U.S. Cl. ................ 360/256.2; 360/256.3
(58) Field of Classification Search ............. 360/256.2, 360/97.01, 256.3, 265, 264.7
See application file for complete search history.

(56) References Cited

U.S. PATENT DOCUMENTS

| | | | | |
|---|---|---|---|---|
| 5,172,282 A * | 12/1992 | Ghose | ...................... | 360/78.12 |
| 5,235,481 A * | 8/1993 | Kamo et al. | ............. | 360/97.01 |
| 5,523,910 A * | 6/1996 | von Alten | ................. | 360/256.3 |
| 5,532,891 A * | 7/1996 | Tsujino | .................... | 360/264.7 |
| 7,251,088 B2 * | 7/2007 | Matsui | ........................ | 360/55 |
| 2006/0023365 A1 * | 2/2006 | Tokizaki et al. | ........... | 360/256.2 |

FOREIGN PATENT DOCUMENTS

| | | |
|---|---|---|
| JP | 2002-190169 | 7/2002 |
| JP | 2003-068038 | 3/2003 |
| JP | 2006-048768 | 2/2006 |

* cited by examiner

*Primary Examiner*—Jefferson Evans
(74) *Attorney, Agent, or Firm*—Greer, Burns & Crain, Ltd.

(57) ABSTRACT

A disc drive includes a motor that drives a disc, a slider that accesses the disc, a carriage that moves the slider, a housing that houses the disc, motor, slider, and carriage, and includes a rotating part that has an engagement part with the carriage at one end, and a first magnetic member at another end, and a printed board being provided on and approximately parallel to a bottom surface of the housing. The printed board includes a second magnetic member that extends from the inside of the housing to the printed board, and the printed board further includes a coil that forms an electromagnet with the second magnetic member, and is arranged in accordance with a shape of the bottom surface of the housing.

14 Claims, 8 Drawing Sheets

INFORMATION STORAGE THAT INCLUDES A HOUSING AND A PRINTED BOARD PROVIDED ON THE HOUSING, A PRINTED BOARD INCLUDING A COIL THAT FORMS AN ELECTROMAGNET IN COOPERATION WITH A MAGNETIC MEMBER, AND METHOD FOR MANUFACTURING AN ELECTROMAGNETIC LATCH UNIT

This application claims the right of a foreign priority based on Japanese Patent Application No. 2006-197417, filed on Jul. 19, 2006, which is hereby incorporated by reference herein in its entirety as if fully set forth herein.

BACKGROUND OF THE INVENTION

The present invention relates generally to an information storage, and more particularly to an electronic latch unit for a disc drive. The present invention is suitable, for example, for an electromagnetic latch unit in a hard disc drive ("HDD").

Along with the recent spread of the Internet etc., a demand for providing a less expensively HDD increases. In addition, a further miniaturization is promoted with widespread portable HDDs and the improvement of the shock resistance is necessary to stably use them in various environments.

The HDD typically includes a disc that serves as a recording medium, and a head stack assembly ("HAS") that supports a head and moves the head to a target position on the disc. The HSA includes a carriage (also referred to as an "actuator", an "E-block" due to its E-shaped section or "actuator ("AC") block") which is rotated around a shaft by the motor, a suspension attached to a support portion of the carriage (which is referred to as an "arm" hereinafter), and a magnetic head part supported on the suspension. The magnetic head part includes a fine head core (simply referred to as a "head" hereinafter) that records and reproduces a signal, and a (head) slider that supports the head and floats above the disc.

One known conventional shock resistance mechanism is a ramp loading system that retreats the slider from the disc in stopping the disc rotation, and holds the slider on a ramp. Nevertheless, the carriage at this state receiving the external impact would rotate, colliding the slider with the disc, damaging the head, and losing the disc data. Accordingly, an electromagnetic latch unit as another proposed shock resistance mechanism engages with the carriage's end opposite to the suspension while the slider is being held on the ramp (see, for example, Japanese Patent Applications, Publication Nos. 2002-190169, 2003-68038, and 2006-48768).

The conventional electromagnetic latch unit is often configured so that the latch part and an electromagnet are mounted in the internal space on the front side of the housing. The electromagnetic latch unit magnetically locks the latch part that latches the carriage end and, in rotating the disc, unlocks the latch part and moves the latch part to the unlatch position. A controller in the printed board fixed on the rear surface of the housing controls latching and unlatching. A magnet is embedded in the latch part, and held at a predetermined height from the HDD housing. The electromagnet includes a coil and a core (or yoke), and the coil is connected to the printed board via a lead wire.

However, a connection of the coil to the printed board expensively requires various steps of: (1) piercing the housing and threading the lead wire; (2) sealing the pierce to maintain the inside of the housing airtight; (3) mounting the printed board with a connector, and connecting the connector with the controller; (4) connecting the lead wire to a land of the flexible printed circuit ("FPC") board connected with the connector; and (5) baking the housing so that the gas generated from the coil does not contaminate the inside of the housing. In addition, the disconnection of the lead wire lowers the yield, and the electromagnetic latch unit provided in the housing precludes a further miniaturization of the housing.

Figure 6:
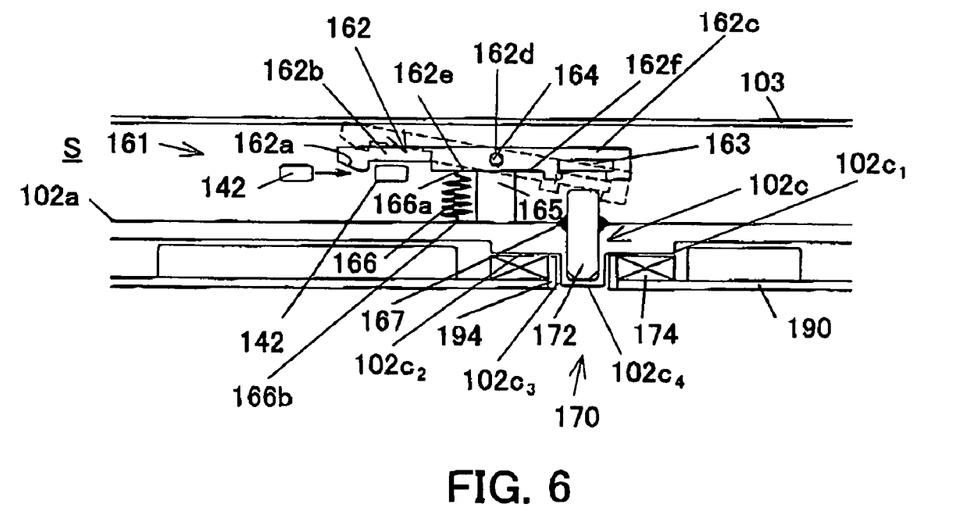
FIG. 6 is a sectional view of still another variation of the electromagnetic latch unit shown in FIG. 3.

Japanese Patent Application, Publication No. 2002-190169, FIG. 6, provides the latch part in the housing, and arranges the electromagnet outside housing. The housing is located between the latch part and the electromagnet, possibly causing the electromagnetic efficiency to become worse than the housing at accommodates both the latch part and the electromagnet in its internal space. In addition, this prior art reference is unsuitable for the economical efficiency and the miniaturization, because this prior art reference does not provide the housing with a flat bottom surface suitable for the opposite printed board,

BRIEF SUMMARY OF THE INVENTION

The present invention is directed to an information storage that improves the economical efficiency and the miniaturization.

An information storage according to one aspect of the present invention includes a motor that drives a recording medium that stores data, a slider that accesses the recording medium, a carriage that moves the slider, a housing that houses the recording medium, the motor, the slider, and the carriage, and includes a rotating part that can rotate and has an engagement part with the carriage at one end, and a first magnetic member at another end, and a printed board being provided on and approximately parallel to a bottom surface of the housing, the printed board including a first controller that controls at least the carriage, and a second controller that controls the motor, wherein the housing further includes a second magnetic member that extends from the inside of the housing to the printed board, and the printed board further including a coil that forms an electromagnet in cooperation with the second magnetic member, and is arranged in accordance with a shape of the bottom surface of the housing. The outside dimension of the information storage, such as a magnetic disc drive, is determined by the standard, and the space is restricted in arranging the coil on the printed board. The inventive information storage uses an existing printed board mounted with various controllers, without an additional printed board for the coil. As a result, this configuration maintains the outside dimension of the apparatus (in particularly the height), and minimizes the number of increased components and design changes, thereby providing a small and thin information storage. An arrangement in accordance with the shape means an arrangement that maximizes the space. The printed board parallel to the housing's bottom surface can maintain the height of the information storage constant.

The first magnetic member may be made of a ferromagnetic material, and the second magnetic member may perforate the housing. Since the housing's bottom surface is parallel to the printed board, the manufacture of the housing is easy and the coil arrangement on the printed board also becomes easy. In addition, no unnecessary projection can make the information storage thin. When the soft magnetic member that perforates the housing and the coil arranged on the printed board form the electromagnet, no elements exist between the electromagnet and the first magnetic member and this configuration is suitable for the operation of the electromagnetic latch unit. Therefore, this electromagnetic latch unit can prevent contaminations inside of the housing, and maintain the conventional performance.

The information storage may further include an elastic member that moves the moving part, wherein the first magnetic member may be made of a soft magnetic material, and the second magnetic member may perforate the housing. A similar effect is maintained even when the magnetic material is changed from the hard magnetic material to the soft magnetic material. Although it is unnecessary to generate repulsions and attractions by switching a polarity of the current through the coil, only an attraction acts between the moving part and the electromagnet, requiring an elastic member, such as a spring, which generates a repulsion The first magnetic member may be made of a ferromagnetic material, the housing having a dent part that forms a convex to the outside of the housing, accommodates the second magnetic member, and has a surface approximately parallel to another housing surface. The electromagnet can be thus formed even without perforating the housing, when the housing has a convex structure to the outside and part of the housing is inserted into the coil. Of course, the information storage may further include an elastic member that moves the moving part, the first magnetic member being made of a soft magnetic material, and the housing having a dent part that forms a convex to the outside of the housing, accommodates the second magnetic member, and has a surface approximately parallel to another housing surface.

The housing may be made of a magnetic material, the first magnetic material being made of a ferromagnetic material, the information storage further including a non-magnetic member arranged around the second magnetic material, and the non-magnetic member and the second magnetic member perforating the housing. A similar effect to the non-magnetic housing can be obtained by arranging the non-magnetic member so that the magnetic housing and the soft magnetic member do not contact each other. In an information storage, such as a small card-type HDD, a magnetic (or sheet metal) housing can be used.

The information storage may further include an elastic member that moves the moving part, and a non-magnetic member arranged around the second magnetic material, the housing being made of a magnetic material, the first magnetic member being made of a soft magnetic material, the non-magnetic member and the second magnetic member perforating the housing. The present invention is applicable to the information storage that includes a moving part that uses a soft magnetic member and a magnetic housing. In addition, the second magnetic member may be pressed-fit into the housing, and adhered to the housing. Thereby, an airtight feature can be surely maintained. The printed board may be notched at part opposing to the second magnetic material. Since it is unnecessary to connect the soft magnetic member and the printed board to each other, the processing accuracy of the soft magnetic member can be made low and the production cost can be restrained. The information storage may include a wall part (bobbin) on the printed board along the second magnetic member, the coil being wound around the wall part. Thereby, the attachment of the coil can become easy.

An electromagnetic latch unit according to another aspect of the present invention includes a latch part that moves between a latch position used to latch an end of a carriage opposite to the head with respect to a shaft, and an unlatch position used to unlatch the end, the carriage rotating the head around the shaft, the head being configured to record information in and reproduce the information from a recording medium arranged in a housing of an information storage, the latch part including a ferromagnetic member, and an electromagnet that includes a coil and a core, magnetizes the ferromagnetic member, and moves the latch part, the coil being arranged parallel to a surface mounted with the carriage and outside a space of the housing which accommodates the latch part. This electromagnetic latch unit can make the inside of the housing small and thin, since the coil is located outside the housing. When the coil is provided outside the housing, the generated gas does not contaminate the inside of the housing and thus the conventional baking process can be omitted, reducing the number of steps and the cost. The ferromagnetic member attached to the latch part may be a magnet or a hard magnetic material or a soft magnetic material. The soft magnetic material needs the forcing means that moves the latch part from the unlatch position to the latch position. In addition, the coil is arranged parallel, rather than oblique as in Japanese Patent Application, Publication No. 2002-190169, to the surface of the housing mounted with the carriage, and the printed board can also be made parallel, whereby the unit can be made small.

The coil may be provided on a printed board that controls rotations of the carriage, and controls latching and unlatching by the latch part. The conventional arrangement of the connector and the lead wire is unnecessary, and the number of steps and the cost can be reduced. In addition, the lowered yield due to the disconnection of the lead wire can also be prevented.

The core may project from a surface mounted with the carriage to the outside of the space, the coil being arranged around a projection of the core. The core may project from the housing, and the concave of the surface of the housing may be formed to accept the core. Thereby, the electromagnet is formed.

A method according to still another aspect of the present invention for manufacturing an electromagnetic latch unit that includes a latch part that moves between a latch position used to latch an end of a carriage opposite to the head with respect to a shaft, and an unlatch position used to unlatch the end, the carriage rotating the head around the shaft, the head being configured to record information in and reproduce the information from a recording medium arranged in a housing of an information storage, the latch part including a ferromagnetic member, and an electromagnet that includes a coil and a core, magnetizes the ferromagnetic member, and moves the latch part includes mounting the coil onto a printed board arranged outside a space of the housing which accommodates the latch part, the printed board controlling rotations of the carriage, and controlling latching and unlatching by the latch part, and press-fitting the core in a hole provided in a surface of the housing which is mounted with the carriage. This electromagnetic latch unit can make the inside of the housing small and thin, since the coil is located on the printed board outside the housing. When the coil is provided outside the housing, the generated gas does not contaminate the inside of the housing and thus the conventional baking process can be omitted, reducing the number of steps and the cost. In addition, direct mounting of the coil onto the printed board does not require the conventional arrangement of the connector and the lead wires, reducing the number of steps and the cost. The lowered yield due to the disconnection of the lead wire can also be prevented. The press fit of the core can easily maintain the inside of the housing airtight. The method may further include the step of applying an adhesive to the hole at least around the surface. Thereby, the internal space of the housing can be made airtight in case of the insufficient press fitting.

An information storage according to still another aspect of the present invention includes a head configured to record information in and reproduce the information from a recording medium, a carriage rotating the head around a shaft, a housing that accommodates the head and the carriage, and an electromagnetic latch unit that latches an end of the carriage opposite to the head with respect to the shaft, wherein the electromagnetic latch unit includes a latch part that moves between a latch position used to latch the end, and an unlatch position used to unlatch the end, the latch part including a ferromagnetic member, and an electromagnet that includes a coil and a core, magnetizes the ferromagnetic member, and moves the latch part, the coil being arranged parallel to a surface of the housing which is mounted with the carriage and outside a space of the housing which accommodates the latch part. This information storage can make the inside of the housing small and thin, since the coil is located on the printed board outside the housing. When the coil is provided outside the housing, the generated gas does not contaminate the inside of the housing and thus the conventional baking process can be omitted, reducing the number of steps and the cost. The ferromagnetic member attached to the latch part may be a magnet or a hard magnetic material or a soft magnetic material. The soft magnetic material needs the forcing means that moves the latch part from the unlatch position to the latch position. The housing may be made of a ferromagnetic material, the information storage further including a non-magnetic member, such as a non-magnetic metal and resin, provided around the core. Thus, the present invention is applicable to the magnetic housing.

Other objects and further features of the present invention will become readily apparent from the following description of the preferred embodiments with reference to accompanying drawings.

DETAILED DESCRIPTION OF THE PREFERRED EMBODIMENTS

Figure 1:
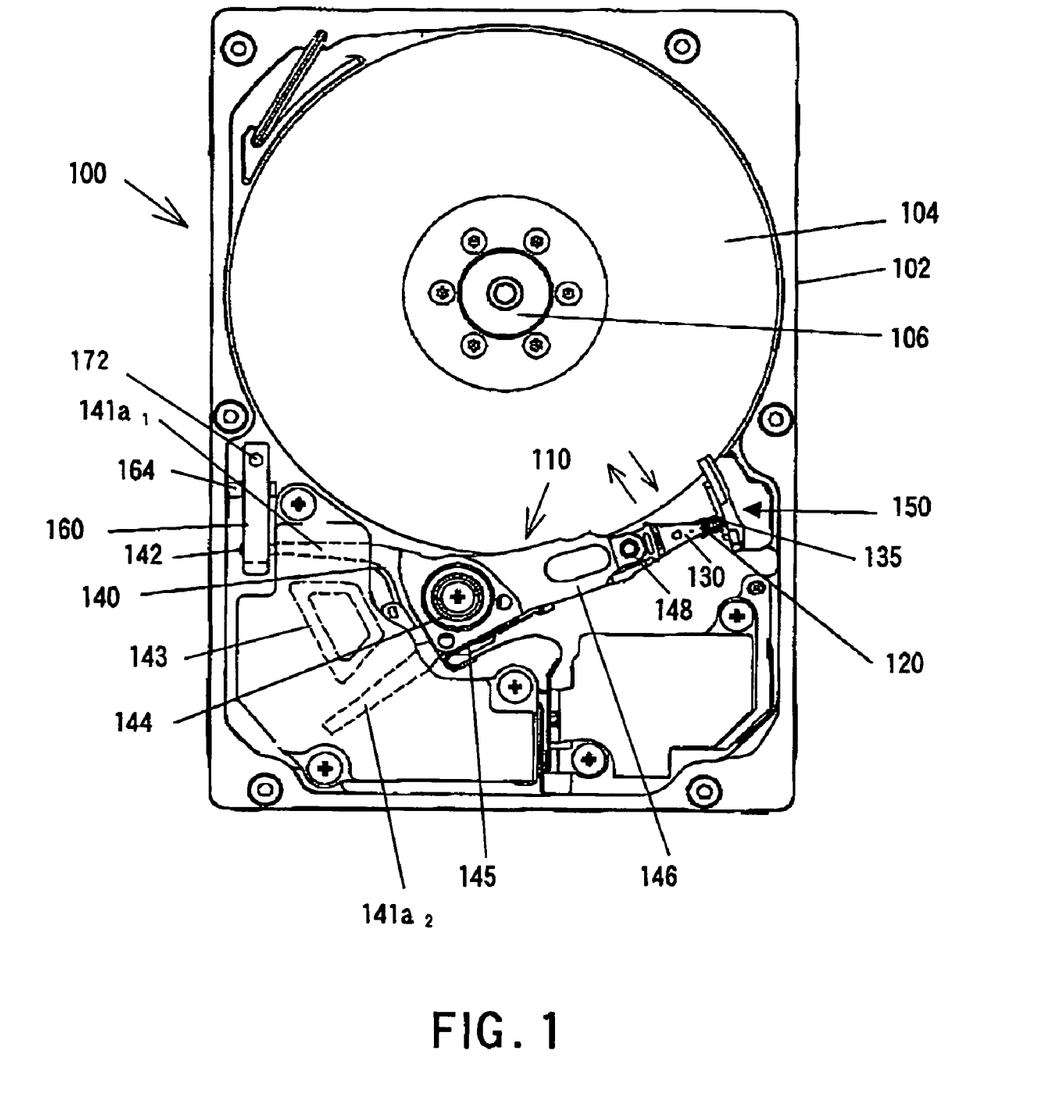
FIG. 1 is an internal structure of a hard disc drive ("HDD") according to one embodiment of the present invention.

Referring now to the accompanying drawings, a description will be given of an information storage according to one embodiment of the present invention. The information storage of this embodiment is implemented as an HDD 100. The HDD 100 includes, as shown in FIG. 1, one or more magnetic discs 104 each serving as a recording medium, a spindle motor 106, a HSA 110 in a housing 102, a ramp 150, an electromagnetic latch unit 160. Here, FIG. 1 is a schematic plane view of the internal structure of the HDD 100.

The housing or base 102 is made, for example, of aluminum die cast base and stainless steel, and has a rectangular parallelepiped shape to which a cover not shown in FIG. 1 that seals the internal space is jointed. These components 104, 106, 110 etc. are mounted in the housing 102 in a clean room, and the sealed space must be maintained clean once the housing 102 is sealed. Aluminum is non-magnetic, but stainless steel can be ferromagnetic or non-magnetic. A card-type HDD, for example, can use a magnetic sheet metal, such as a steel plate. The electromagnetic latch unit 160, which will be described later, can use both non-magnetic and magnetic materials.

The magnetic disc 104 has a high surface recording density, such as 100 Gb/in$^2$ or greater. The magnetic disc 104 is mounted on a spindle of the spindle motor 106 through its center hole of the magnetic disc 104.

The spindle motor 106 has, for example, a brushless DC motor (not shown) and a spindle as its rotor part. For instance, two magnetic discs 104 are used in order of the disc, a spacer, the disc and a clamp stacked on the spindle, and fixed by bolts coupled with the spindle.

The HSA 100 includes a magnetic head part 120, a suspension 130, a carriage 140, and a base plate 148.

Figure 2:
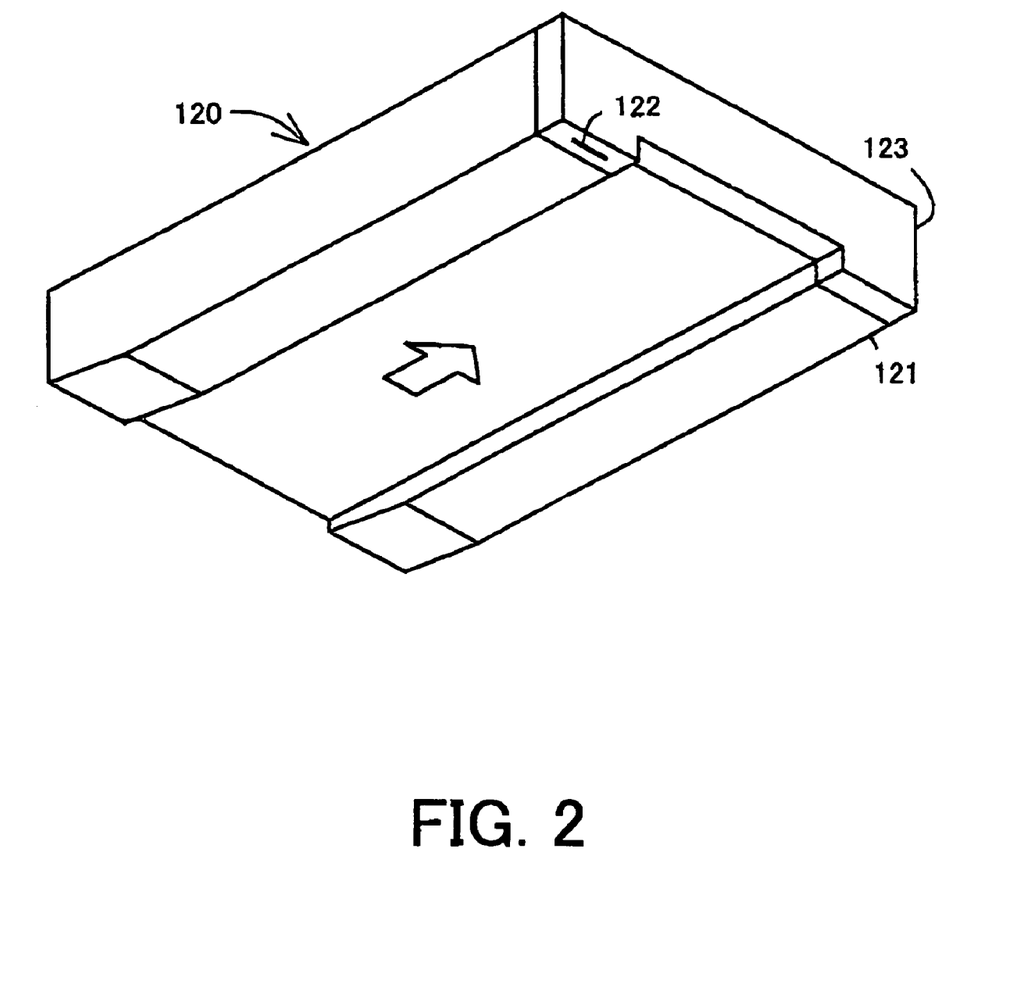
FIG. 2 is an enlarged plane view of a magnetic head part in the HDD shown in FIG. 1.

The magnetic head part 120 includes a slider 121, and a head device built-in film 123 that is jointed with an air outflow end of the slider 121 and has a reading and recording head 122.

The slider 121 has an approximately rectangular parallelepiped shape, and is made of $Al_2O_3$—TiC (Altic). The slider 121 supports the head 122 and floats above the surface of the disc 104. The bead 122 records information in and reproduces information from the disc 104. The head 122 is, for example, a MR inductive composite head that includes an inductive head device that writes binary information in the magnetic disc 104 utilizing the magnetic field generated by a conductive coil pattern (not shown), and a magnetoresistive ("MR") head that reads the binary information based on the resistance that varies in accordance with the magnetic field applied by the magnetic disc 104. A medium opposing surface to the magnetic disc 104, i.e., a floating surface 124 receives the airflow that occurs with rotations of the magnetic disc 104. Here, FIG. 2 is a schematic plane view of the magnetic head part 120.

The suspension 130 serves to support the magnetic head part 120 and to apply an elastic force to the magnetic head part 120 against the magnetic disc 104, and is, for example, a stainless steel suspension. The suspension 130 has a flexure (also referred to as a gimbal spring or another name) which cantilevers the magnetic head part 120, and a load beam (also referred to as a load arm or another name) which is connected to the base plate 148. The load beam has a spring part at its center so as to apply a sufficient compression force in a Z direction. The suspension 130 also supports a wiring part that is connected to the magnetic head part 120 via a lead wire etc.

An elongated portion called a lift tab 135 is provided to a top of the suspension 130. The lift tab 135 is integrated with the suspension 130 and made of the same material as the suspension 130. The lift tab 135 slides over the ramp 150 to load and unload the slider 121: The lift tab 135 loads the slider 121 from the ramp 150 to the disc 104 in starting driving of the disc 104, and unloads the slider 121 from the disc 104 in finishing driving of the disc 104, allowing the ramp 150 to hold the slider 121.

The carriage 140 serves to rotate the magnetic head part 120 in arrow directions shown in FIG. 1, and includes a pair of legs 141$a_1$ and 141$a_2$, a voice coil motor 143, a flexible printed circuit ("FPC") board 145, and an arm 146.

Among the pair of legs 141$a_1$ and 141$a_2$, an end 142 of the leg 141$a_1$ is engageable with the electromagnetic latch unit 160. The end 142 has a rectangular section, as shown in FIGS. 3 to 8, which will be described later.

The voice coil motor 143 has a flat coil between a pair of yokes. The flat coil opposes to a magnetic circuit (not shown) provided to the housing 102, and the carriage 140 swings around the support shaft 144 in accordance with values of the current that flows through the flat coil. The magnetic circuit includes, for example, a permanent magnet fixed onto an iron plate fixed in the housing. 102, and a movable magnet fixed onto the carriage 140.

The support shaft 144 is inserted into a hollow cylinder in the carriage 140, and extends perpendicular to the paper surface of FIG. 1 in the housing 102. The FPC board 145 provides the wiring part with a control signal, a signal to be recorded in the disc 104, and the power, and receives a signal reproduced from the disc 104.

The arm 146 is an aluminum rigid body, and has a perforation hole at its top. The suspension 130 is attached to the arm 146 via the perforation hole and the base plate 148. The base plate 148 serves to attach the suspension 130 to the arm 146, and includes a welded section, and a dent or dowel. The welded portion is laser-welded with the suspension 130. The dent is a part to be swaged with the arm 146.

The ramp 150 sits near the outer circumference of the disc 104, and partially projects above the disc 104. The ramp 150 is fixed onto the bottom surface of the housing 102 via screws, etc., and guides, holds, and slidably contacts the lift tab 135. This embodiment refers to a standby position as a home position that holds the lift tab 135 on the ramp 150.

The electromagnetic latch unit 160 latches (engages with) and unlatches (disengages from) the end 142 of the carriage 140. The electromagnetic latch unit 160 restricts the carriage 140 from rotating counterclockwise in FIG. 1 due to the external shock while the ramp 150 holds the lift tab 135. Therefore, the electromagnetic latch unit 160 prevents a counterclockwise rotation of the lift tab 135 in FIG. 1, and a collision between the slider 121 and the disc 104. As a result, the electromagnetic latch unit 160 prevents damages of the head 122, and a loss of the data of the disc 104. The electromagnetic latch unit 160 includes a latch part 161, and an electromagnet 170.

The latch part 161 serves to latch and unlatch the end 142. The latch part 161 includes a body 162, a ferromagnetic member 163, a rotating shaft 164, and a support shaft 165.

The body 162 can rotate around the rotating shaft 164 between a latch position for latching the end 142 and an unlatch position for unlatching the end 142. In FIGS. 3 to 8, a solid line denotes the latch position of the body 162, and this embodiment prohibits a further counterclockwise rotation of the body 162. In addition, in FIGS. 3 to 8, a broken line denotes the unlatch position of the body 162, and this embodiment prohibits a further clockwise rotation of the body 162.

The body 162 has a rectangular shape when viewed from the top as shown in FIG. 1. The body 162 includes, as shown in FIGS. 3 to 8, a chamfered part or bevel 162$a$, accommodation parts 162$b$ and 162$c$, an engagement hole 162$d$, and engagement parts 162$e$ and 162$f$.

The chamfered part 162$a$ contacts the edge of the end 142 that moves in the arrow direction, and moves the body 162 clockwise when the end 142 proceeds further in the arrow direction. The chamfered part 162$a$ has a rectangular shape as shown in FIG. 1 when viewed from the top. The accommodation part 162$b$ is a rectangular concave that houses the latched end 142. The accommodation part 162$c$ is a concave that houses the ferromagnetic member 163. The engagement hole 162$d$ is formed near the center of gravity of the body 162 to which the ferromagnetic member 163 is attached, aligned with the lateral direction shown in FIG. 1 (in the direction perpendicular to the paper plane of FIGS. 3 to 8), and perforated by the rotating shaft 164, such as a pin. The accommodation parts 162$b$ and 162$c$ are formed on the opposite side with respect to the engagement hole 162$d$. The engagement parts 162$e$ and 162$f$ are parts engageable with the spring 166.

The ferromagnetic member 163 is made of a material attracted to a magnet, and attached to the accommodation part 162$c$. The ferromagnetic material is classified into a hard magnetic material and a soft magnetic material. The hard magnetic material (magnet) serves as a magnet even when the magnetic field is removed. On the other hand, the soft magnetic material does not serve as a magnet once the magnetic field is removed.

Figure 3:
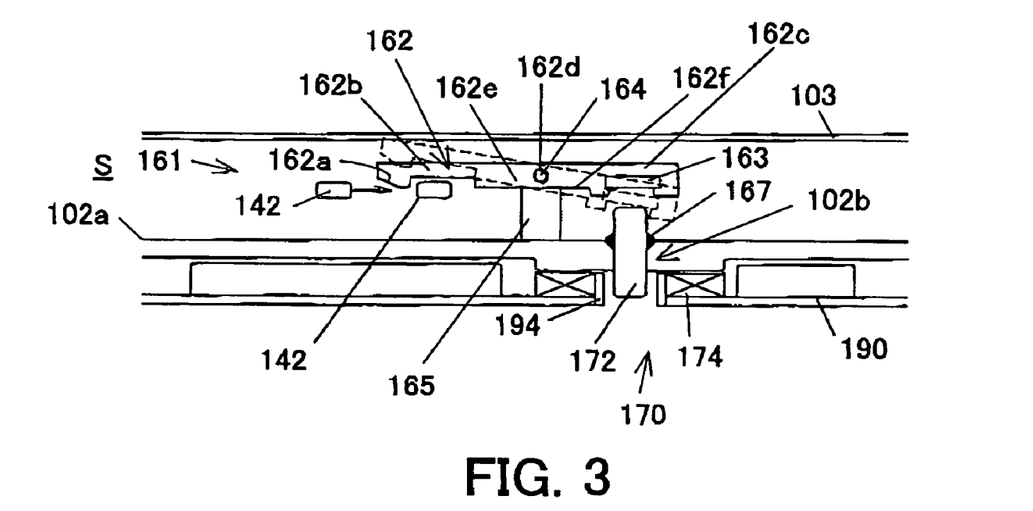
FIG. 3 is a sectional view of the HDD shown in FIG. 1 near an electromagnetic latch unit.
Figure 4:
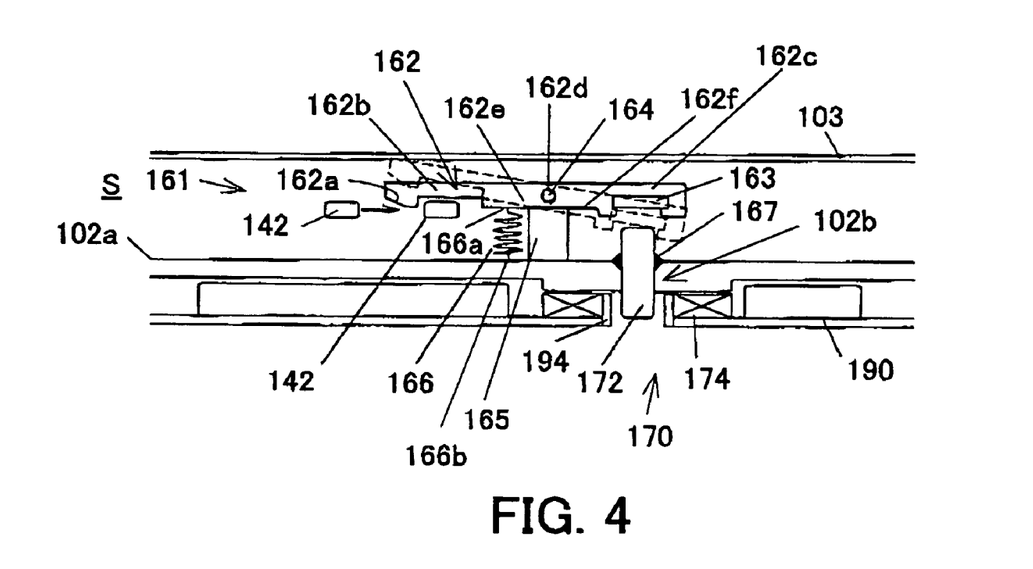
FIG. 4 is a sectional view of a variation of the electromagnetic latch unit shown in FIG. 3.
Figure 5:
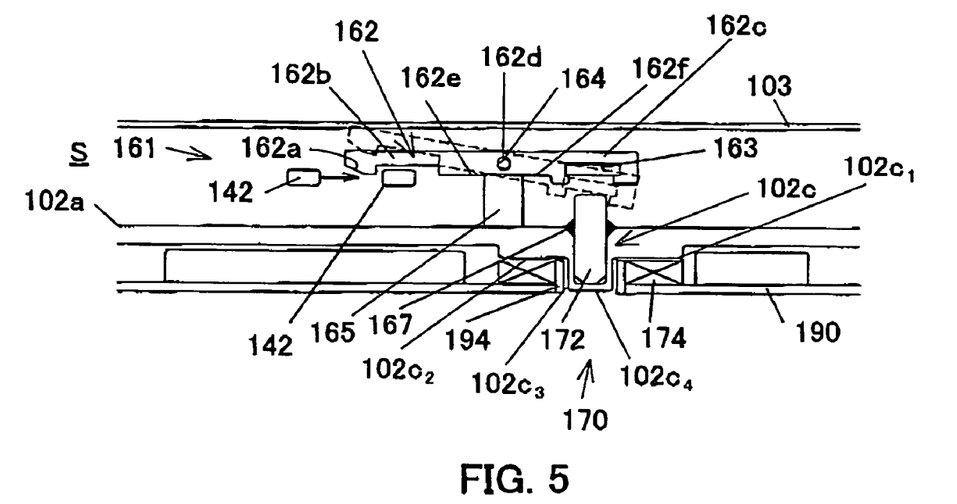
FIG. 5 is a sectional view of another variation of the electromagnetic latch unit shown in FIG. 3.
Figure 7:
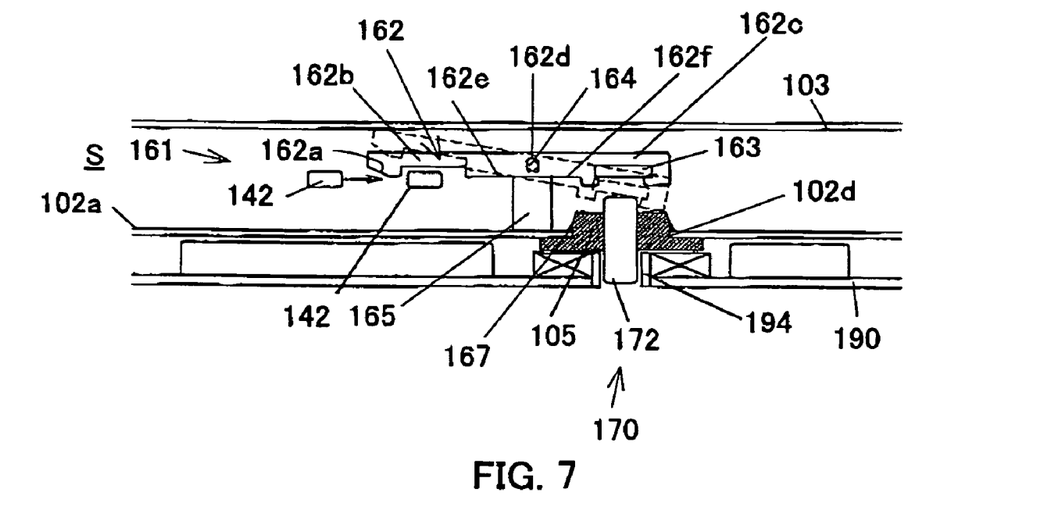
FIG. 7 is a sectional view of still another variation of the electromagnetic latch unit shown in FIG. 3.
Figure 8:
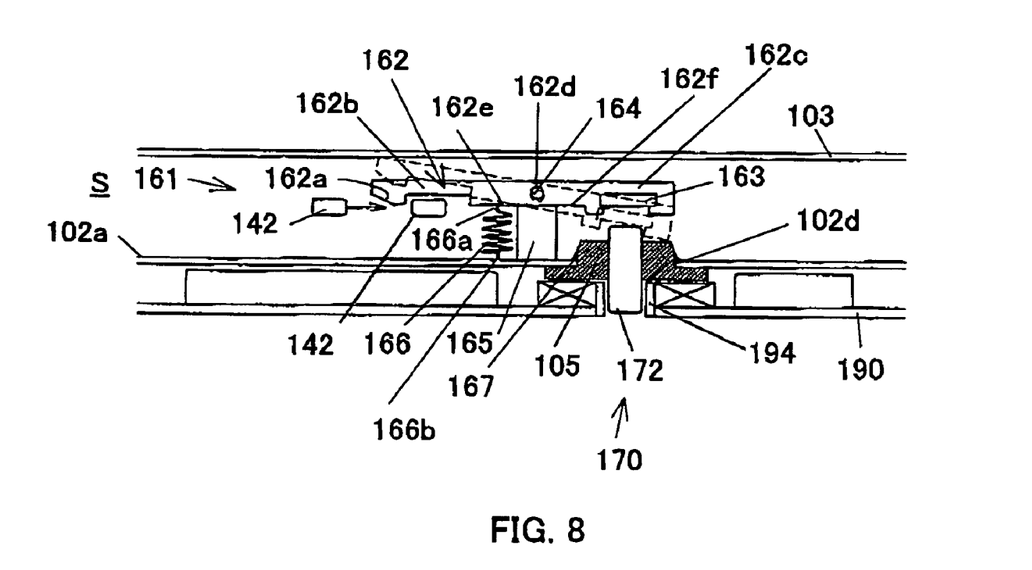
FIG. 8 is a sectional view of still another variation of the electromagnetic latch unit shown in FIG. 3.

FIGS. 3, 5 and 7 are partial sectional views of the HDD 100 near the electromagnetic latch unit 160 when the ferromagnetic member 163 is a magnet or a hard magnetic material. FIGS. 4, 6 and 8 are partial sectional views of the HDD 100 near the electromagnetic latch unit 160 when the ferromagnetic member 163 is a soft magnetic material. The ferromagnetic member 163 that is a magnet serves as a reset means of the body 162 by inverting the current direction through the electromagnet 170. On the other hand, the ferromagnetic member 163 made of the soft magnetic material simply moves towards the electromagnet 170, irrespective of a magnetic pole inversion of the electromagnet 170, normally causing the unlatch position. Therefore, a forcing means for resetting the body 162 to the latch position is necessary. Accordingly, FIGS. 4, 6, and 8 provide a spring 166 as the forcing means.

As shown in FIGS. 4, 6 and 8, the spring 166 is a tension spring when one end of the spring 166 is engaged with the engagement part 162$e$, and the other end 166$b$ is engaged with the surface 102$a$ mounted with the carriage 140. On the other hand, the spring 166 is a compression spring, when one end of the spring 166 is engaged with the engagement part 162$f$, and the other end 166$b$ is engaged with the surface 102$a$ mounted with the carriage 140. Of course, the present invention does not prevent use of other forcing means, such as a solenoid, a piezoelectric element, and an elastic member.

One end of the support shaft 165 is fixed onto a surface 102$a$ of the housing 102, and the support shaft 165 extends perpendicular to it. The other end of the support shaft 165 is engaged with the rotating shaft 164. The support shaft 165 may have an adjusted shape of its other end (not shown) that contacts the body 162, whereby the body 162 is not rotated counterclockwise further than the latch position preventing the body 162 from rotating clockwise further than the unlatch position. Of course, any rotating restriction methods known in the art may be applied. The support shaft 165 may be provided with the cover 103.

The electromagnet 170 magnetizes the ferromagnetic member 163, rotates the body of the latch part 161 around the rotating shaft 164, and includes a core 172 and a coil 174.

The core 172 is provided perpendicular to the surface 102$a$ of the housing under the ferromagnetic member 163. The core 172 may perforate through the perforation holes 102$b$ and 102$d$ in the housing 102, as shown in FIGS. 3, 4, 7 and 8. In addition, in FIGS. 5 and 6, a concave 102$c$ is formed which extends from the internal or sealed space S in the housing 102 to the outside, and the coil 172 may be embedded in the hole in the concave $102c$. The concave $102c$ has a surface $102c_1$, a surface $102c_2$, a surface $102c_3$, and a surface $102c_4$. The surface $102c_1$ perpendicularly extends from the rear surface of the surface $102a$ to the outside (to the opposite side to the internal space S). The surfaces $102c_2$ and $102c_4$ are parallel to the rear surface of the surface $102a$. The surface $102c_3$ perpendicularly extends to the outside of the surface $102c_2$. Viewed from the rear surface of the housing 102, the convex $102c$ has a convex shape having an annular surface $102c_2$ outside the cylinder having the circular surface $102c_4$.

The conventional electromagnet is arranged on the surface $102a$ mounted with the carriage 140 in the internal space S of the housing 102. On the other hand, the core 172 in this embodiment projects down from the surface $102a$ of the housing 102. The coil 174 is arranged around the bottom end of the coil 172 and forms the electromagnet 170. The core 172 projects to the outside of the housing 102, enabling the coil 174 to be arranged outside the internal surface S as described later.

The coil 174 is arranged outside the internal space of the housing 102, making the internal space S of the housing 102 small and thin. The coil 174 does not contaminate the internal space S with the gas generated from it, eliminating the conventional baking process, and reducing the number of steps and the cost.

Figure 9:
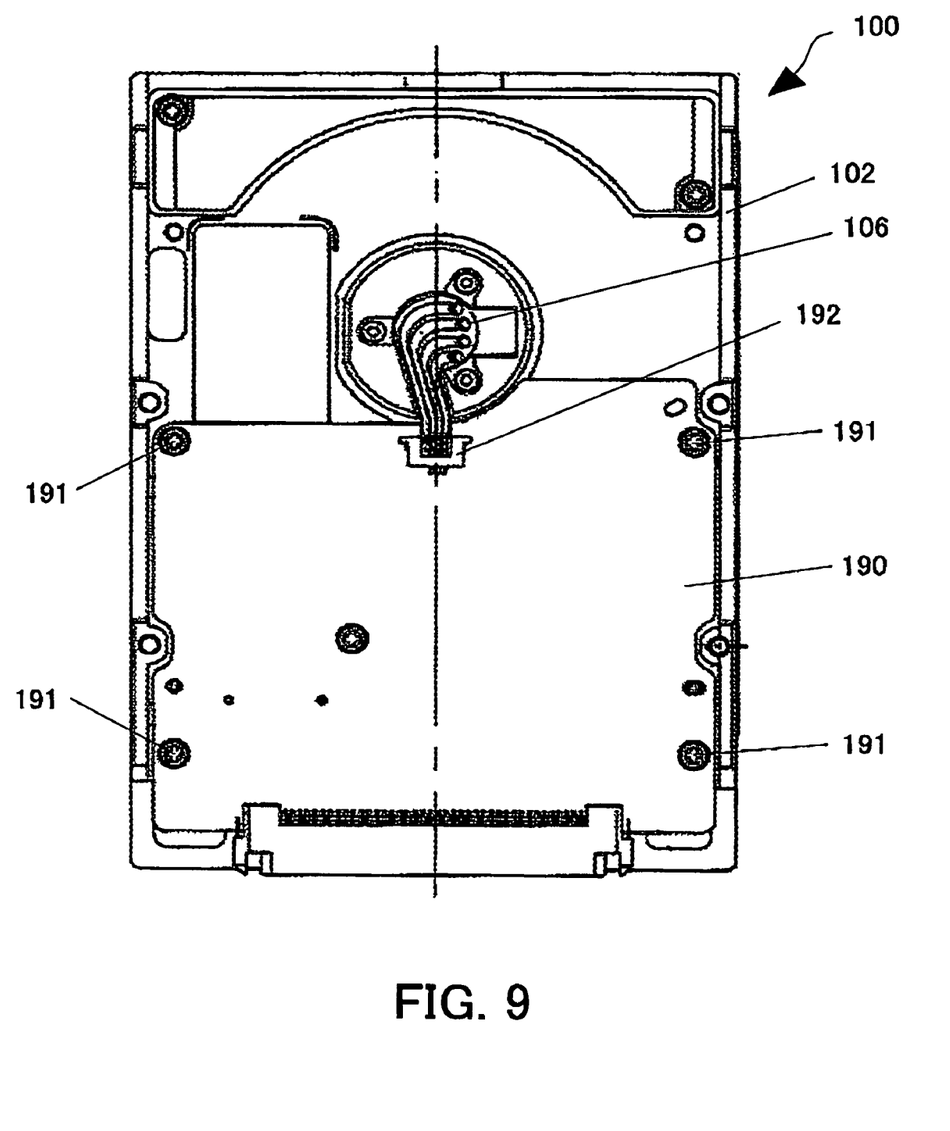
FIG. 9 is a rear view of the HDD shown in FIG. 1.

The coil 174 is arranged on the printed board 190 shown in FIG. 9. Here, FIG. 9 is a rear view of the HDD 100. The printed board 190 is approximately parallel to the bottom surface of the housing 102, and can make constant the height of the HDD 100.

Direct mounting of the coil 174 onto the printed board 190 eliminates the conventional arrangement of the connector and lead wires, reducing the number of steps and the cost, and preventing the lowed yield due to the disconnections of the lead wires. The spindle motor 106 is connected to the printed board 190 via the connector 192. A wall part (bobbin) 194 is provided along the coil on the printed board 190, and the coil 174 may be wound around the wall part 194, facilitating the attachment of the coil 174.

The perforation hole or notch may be provided at part of the printed board 190 opposite to the core 172. No connection between the core 172 and the printed board 190 can lower the processing accuracy of the core 172, reducing the production cost. Of course, the printed board 190 may have no perforation hole at a position corresponding to the core 172.

In FIGS. 3, 4, 7 and 8, the core 172 perforates the housing. However, the bottom surface of the housing 102 parallel to the printed board 190 facilitates a production of the housing 102, and an arrangement of the coil 174 on the printed board 190. No useless projection would make the HDD 100 thin.

Figure 10:
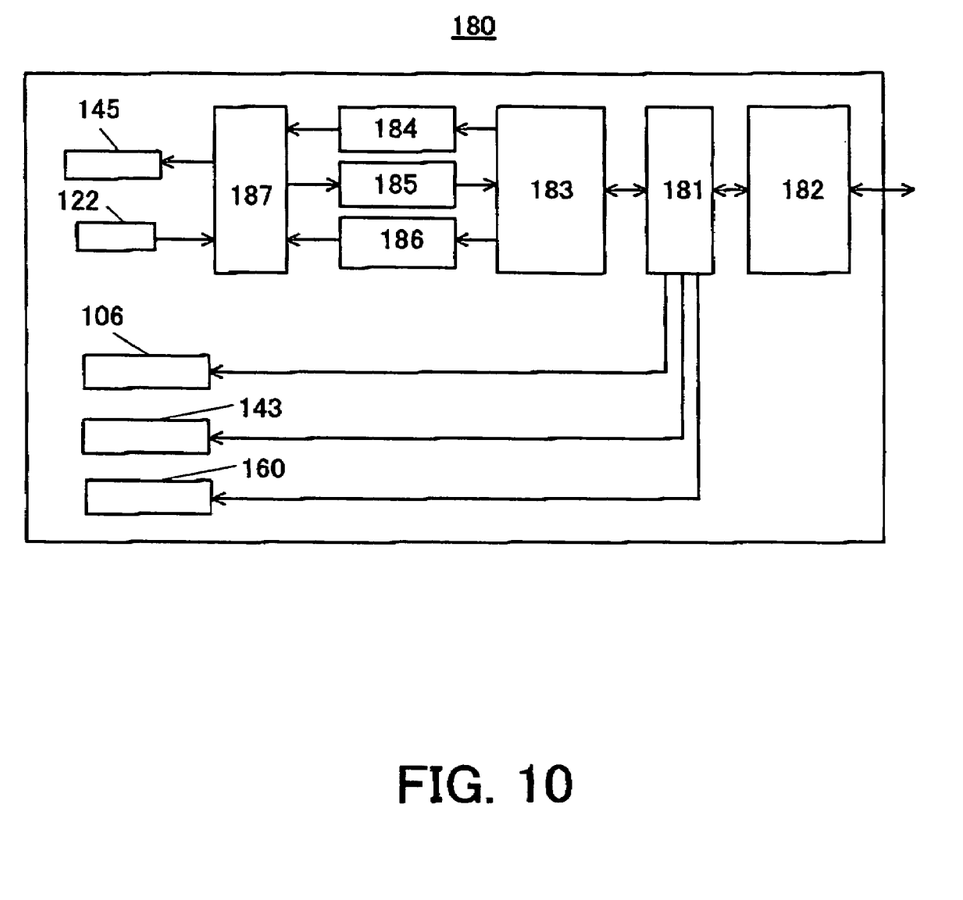
FIG. 10 is a block diagram of a control system in the HDD shown in FIG. 1.

The printed board 190 is mounted with a control system 180 shown in FIG. 10. Here, FIG. 10 is a block diagram of the control system 180. The control system 180 is a control illustration in which the head 122 has an inductive head and an MR head. The control system 180 of the HDD 100, which can be implemented as a control board in the HDD 100, includes a controller 181, an interface 182, a hard disc controller (referred to as "HDC" hereinafter) 183, a write modulator 184, a read demodulator 185, a sense-current controller 186, and a head IC 187. Of course, they are not necessarily integrated into one unit; for example, only the head IC 187 is connected to the carriage 140.

The controller 181 covers any processor such as a CPU and MPU irrespective of its name, and controls each part in the control system 180. For example, the controller 180 controls the rotations and stops of the spindle motor 106, rotations of the carriage 140, latches and unlatches of the latch part 161 of the electromagnetic latch unit 160. Of course, the controller that controls rotations and stops of the spindle motor 106 may be different from the controller that controls the swings of the carriage 140.

The controller 181 and the coil 174 are arranged in accordance with a shape of the bottom surface of the housing 102. The outside dimension of the HDD 100 is determined by the standard, and restricted by the space in arranging the coil 174 onto the printed board 190. The HDD 100 uses the conventional printed board 190 without adding a printed board for the coil. As a result, this configuration minimizes the increased number of components and the design change without a change of the outside dimension of the HDD 100, in particular a height, thereby providing a small and thin information storage. The "arrangement in accordance with a shape" intends to maximize the space efficiency.

The interface 182 connects the HDD 100 to an external apparatus, such as a personal computer ("PC" hereinafter) as a host. The HDC 183 sends to the controller 181 data that has been demodulated by the read demodulator 185, sends data to the write modulator 184, and sends to the sense-current controller 186 a current value as set by the controller 181. Although the controller 181 provides servo control over the spindle motor 106 and the motor 143 in the carriage 140, the HDC 183 may serve as such servo control.

The write modulator 184 modulates data and supplies data to the head IC 187, which data has been supplied, for example, from the host through the interface 182 and is to be written down onto the disc 104 by the inductive head. The read demodulator 185 demodulates data into an original signal by sampling data read from the disc 104 by the MR head device. The write modulator 184 and read demodulator 185 may be recognized as one integrated signal processor. The head IC 187 serves as a preamplifier. Each part may apply any structure known in the art, and a detailed description thereof will be omitted.

The coil 174 is arranged around the projection of the core 172. The projection of the core 172 is the bottom of the core 172 as shown in FIGS. 2, 3, 7 and 8, or may be the core 172 and the concave $102c$ of the housing 102, thereby forming the electromagnet 170. A configuration that arranges no component between the electromagnet 170 and the ferromagnetic member 163 is suitable for the operation of the electromagnetic latch unit 160, preventing the contamination in the internal space S, and keeping the conventional performance.

As described above, the housing 102 may be made of a magnetic material. In this case, as shown in FIGS. 7 and 8, the non-magnetic material 105 is preferably arranged around the core 172. The non-magnetic material 105 is, for example, non-magnetic metal or resin. The electromagnetic latch unit 160 may serves as if the housing 102 is made of a non-magnetic material, such as aluminum, by arranging the non-magnetic material 105 that separates that the ferromagnetic housing 102 from the core 172.

If necessary, the core 172 is divided and provided both in the inside and the outside of the housing 102. The electromagnet's efficiency is determined by (the permeability)×(the core's area), and the diameter of the core 172 may be increased inside the housing 102 (at part that is less affected by the restriction of the coil 174). Moreover, in order to reduce the length of the core 172, the coil 174 may be arranged closer to the ferromagnetic member 163 by heaving the housing 102. In this case, in FIGS. 2 and 3, part of the housing 102 above the coil 174 heaves up.

Figure 11:
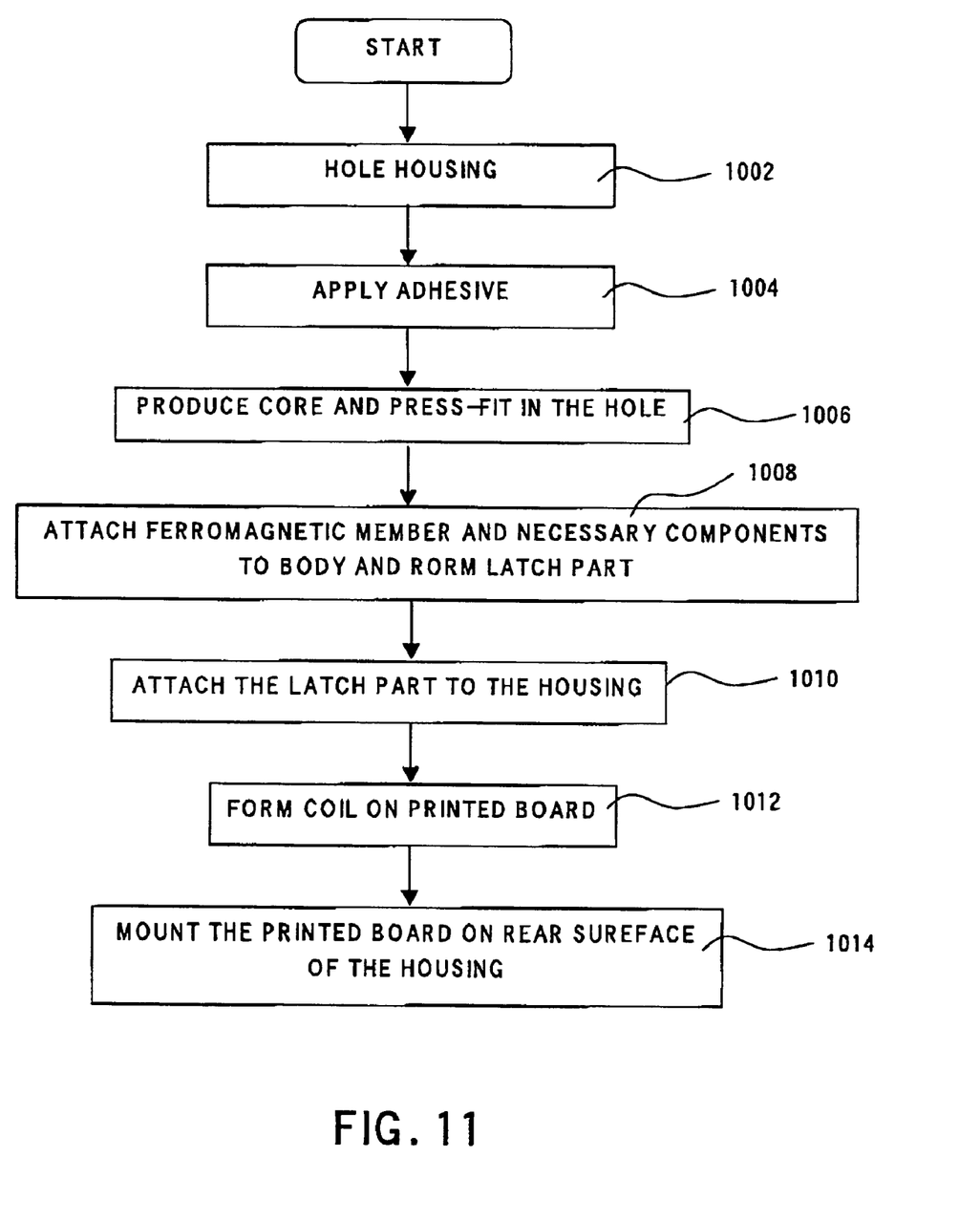
FIG. 11 is a flowchart for explaining a manufacturing method of the electromagnetic latch wit shown in FIG. 1.

Referring now to FIG. 11, a description will be given of a manufacturing method of the electromagnetic latch unit 160.

Here, FIG. 11 is a flowchart for explaining the manufacturing method of the electromagnetic latch unit 160.

Initially, holes 102b, 102c and 102d are formed in the housing 102 (step 1002). In this case, prior to the step 1002, a type of the hole in the housing 102 is determined. Next, an adhesive 167 is applied to the holes at least around the surface 102a (step 1004). This configuration maintains the airtight efficiency of the internal space S. The adhesive 167 is particularly important when the press fit, which will be described later, is insufficient.

Next, the core 172 is produced and press-fit in the holes 102b, 102c, and 102d in the housing 102 (step 1006). The core 172 usually uses a ferromagnetic material, such as an alloy of iron and steel, so as to generate the strong magnetic density with a small amount of current by magnetizing the core material with a magnetic field generated by the coil 174. The press fit of the core 172 can easily maintain the internal space S airtight.

Next, a latch part 161 is produced by attaching the ferromagnetic member 163 and other necessary components (step 1008). In this case, prior to the step 1008, a type of the ferromagnetic member 163 is determined, such as a hard magnetic material and a soft magnetic material. The other necessary components include the rotating shaft 162, the support shaft 165, and necessary forcing means, such as the spring 166. The ferromagnetic member 163 is insert-molded into the accommodation part 162c. Next, the latch part 161 is attached to the surface 102a of the housing 102 (step 1010).

Next, the coil 174 is formed on the printed board 190 (step 1012). As discussed above, use of the bobbin 194 would facilitate the production of the coil 174. The direct mounting of the coil 174 onto the printed board 190 would eliminate the conventional connector and lead wire, reducing the number of steps and the cost, and preventing the lowered yield due to the disconnection of the lead wire. Next, the printed board 190 is mounted on the rear surface of the housing 102 via screws 191 as shown in FIG. 9 (step 1014). An arrangement of the coil 174 on the printed board 190 outside the internal space S of the housing 102 thus makes the housing 102 small and thin. Due to the coil 174 outside the housing 102, the gas generated from it does not contaminate the internal space S, eliminating the conventional baking process, and reducing the number of steps and the cost.

In operation of the HDD 100, the controller 181 drives the spindle motor 106 and rotates the disc 104. The airflow associated with the rotations of the disc 104 is introduced between the disc 104 and slider 121, forming a fine air film and thus generating the floating force that enables the slider 121 to float over the disc surface.

Next, the controller 181 controls the electromagnetic latch unit 160 and moves the body 162 to move the unlatch position shown by the broken line from the latch position shown by the solid line. For the ferromagnetic member 163 that is a magnet, the current that flows through the coil 174 is inversed. Thereby, the body 162 rotates clockwise from the latch position shown by the solid line due to the repulsion of the magnetic pole in FIGS. 3 to 8. For the ferromagnetic member 163 made of a soft magnetic material, the force of the spring 166 rotates clockwise the body 162 from the latch position shown in the solid line in FIGS. 3 to 8, by stopping the electrification to the coil 174.

The controller 181 then controls the carriage 140 and rotates the carriage 140 around the support shaft 144. Thereby, the end 142 of the carriage 140 is spaced from the latch part 161. Thereafter, the body 162 may or may not be returned to the latch position shown by the solid line. Even when the body 162 is returned to the latch position, the end 142 contacts the chamfered part 162a and rotates the body 162 clockwise to the accommodation part 162b as long as the body 162 is not forced in the counterclockwise by the strong power. When the body 162 is returned to the latch position, the controller 181 electrifies the coil 174 and moves the body 162 from the unlatch position shown by the broken line to the latch position shown by the solid line.

The carriage 140 rotationally controlled by the controller 181 provides the head 122's seek for a target track on the disc 104. The suspension 130 applies an elastic compression force to the slider 121 opposing to the floating power of the slider 121. The balance between the floating power and the elastic force spaces the magnetic head part 120 from the disc 104 by a constant distance.

In writing, the controller 181 receives data from the host (not shown) such as a PC through the interface 182, selects the inductive head device, and sends the data to the write modulator 184 through the HDC 183. In response, the write modulator 184 modulates the data, and sends the modulated data to the head IC 187. The head IC 187 amplifies the modulated data, and then supplies the data as write current to the inductive head device. Thereby, the inductive head device writes down the data onto the target track.

In reading, the controller 181 selects the MR head device, and sends the predetermined sense current to the sense-current controller 186 through the HDC 183. In response, the sense-current controller 186 supplies the sense current to the MR head device through the head IC 187. Thereby, the MR head reads desired information from the desired track on the disc 104.

Data is amplified by the head IC 187 based on the electric resistance of the MR head device varying according to a signal magnetic field, and then supplied to the read demodulator 165 to be demodulated to an original signal. The demodulated signal is sent to the host (not shown) through the HDC 183, controller 181, and interface 182.

When recording or reproducing ends, the controller 181 controls the carriage 140 and rotates the carriage 140 around the support shaft 144, to hold the lift tab 135 on the ramp 150. Next, the controller 181 determines whether the lift tab 135 has moved to the home position of the ramp 150. When the lift tab 135 moves to the home position of the ramp 150, the end 142 of the carriage 140 reaches the accommodation part 162b. When the body 162 is located at the latch position, the end 142 reaches the position under the accommodation part 162b.

When the controller 181 determines that the lift tab 135 has moved to the home position of the ramp 150, the controller 181 increases the current amount in the coil 174 and locks the body 162 at the latch position. When the body 162 is located at the unlatch position, the controller 181 moves the body 162 from the unlatch position to the latch position.

The controller 181 may use a dedicated sensor to determine whether the lift tab 135 has moved to the home position of the ramp 150 or whether the end 142 moves to the accommodation part 162b, or may detect the rotating angle of the carriage 140 for the determination. The sensor may detects the moving state of the lift tab 135 or the end 142, or two sensors may be provided to detect both states.

Further, the present invention is not limited to these preferred embodiments, and various modifications and variations may be made without departing from the spirit and scope of the present invention.

What is claimed is:

1. An information storage comprising:
a motor that drives a recording medium that stores data;
a slider that accesses the recording medium;

a carriage that moves the slider;

a housing that houses said recording medium, said motor, said slider, and said carriage, and includes a rotating part that can rotate and has an engagement part with the carriage at one end, and a first magnetic member at another end; and a printed board being provided on and approximately parallel to a bottom surface of said housing, said printed board including a first controller that controls at least said carriage, and a second controller that controls said motor, wherein said housing further includes a second magnetic member that extends from the inside of said housing to said printed board, and said printed board further including a coil that forms an electromagnet in cooperation with the second magnetic member, and is arranged in accordance with a shape of the bottom surface of said housing.

2. An information storage according to claim 1, wherein the first magnetic member is made of a ferromagnetic material, and the second magnetic member perforates said housing.

3. An information storage according to claim 2, wherein the second magnetic member is pressed-fit into the housing, and adhered to the housing.

4. An information storage according to claim 1, further comprising an elastic member that moves the moving part, wherein the first magnetic member is made of a soft magnetic material, and the second magnetic member perforates said housing.

5. An information storage according to claim 1, wherein the first magnetic member is made of a ferromagnetic material, said housing having a dent part that forms a convex to the outside of the housing, accommodates the second magnetic member, and has a surface approximately parallel to another housing surface.

6. An information storage according to claim 1, further comprising an elastic member that moves the moving part, the first magnetic member being made of a soft magnetic material, and said housing having a dent part that forms a convex to the outside of the housing, accommodates the second magnetic member, and has a surface approximately parallel to another housing surface.

7. An information storage according to claim 1, wherein said housing is made of a magnetic material, the first magnetic material being made of a ferromagnetic material, said information storage further comprising a non-magnetic member arranged around the second magnetic material, and the non-magnetic member and the second magnetic member perforating said housing.

8. An information storage according to claim 1, further comprising an elastic member that moves the moving part, and a non-magnetic member arranged around the second magnetic material, the housing being made of a magnetic material, the first magnetic member being made of a soft magnetic material, the non-magnetic member and the second magnetic member perforating said housing.

9. An information storage according to claim 1, wherein said printed board is notched at part opposing to the second magnetic material.

10. An information storage according to claim 1, further comprising a wall part on said printed board along the second magnetic member, the coil being wound around the wall part.

11. A method for manufacturing an electromagnetic latch unit that includes a latch part that moves between a latch position used to latch an end of a carriage opposite to the head with respect to a shaft, and an unlatch position used to unlatch the end, the carriage rotating the head around the shaft, the head being configured to record information in and reproduce the information from a recording medium arranged in a housing of an information storage, said latch part including a ferromagnetic member, and an electromagnet that includes a coil and a core, magnetizes the ferromagnetic member, and moves said latch part, said method comprising the steps of:

mounting the coil onto a printed board arranged outside a space of the housing which accommodates said latch part, the printed board controlling rotations of the carriage, and controlling latching and unlatching by the latch part; and press-fitting the core in a hole provided in a surface of the housing which is mounted with the carriage.

12. A method according to claim 11, further comprising the step of applying an adhesive to the hole at least around the surface.

13. An information storage comprising:

a head configured to record information in and reproduce the information from a recording medium;

a carriage rotating the head around a shaft;

a housing that accommodates said head and said carriage; and an electromagnetic latch unit that latches an end of the carriage opposite to the head with respect to the shaft, wherein said electromagnetic latch unit includes:

a latch part that moves between a latch position used to latch the end, and an unlatch position used to unlatch the end, said latch part including a ferromagnetic member; and an electromagnet that includes a coil and a core, magnetizes the ferromagnetic member, and moves said latch part, the coil being arranged parallel to a surface of the housing which is mounted with the carriage and outside a space of the housing which accommodates said latch part.

14. An information storage according to claim 13, wherein the housing is made of a ferromagnetic material, said information storage further comprising a non-magnetic member provided around the core.

* * * * *